US011198153B2

(12) United States Patent
Xu et al.

(10) Patent No.: US 11,198,153 B2
(45) Date of Patent: Dec. 14, 2021

(54) MULTI-LAYER COATINGS AND METHODS OF PREPARING THE SAME

(71) Applicant: PPG Industries Ohio, Inc., Cleveland, OH (US)

(72) Inventors: Xiangling Xu, Pittsburgh, PA (US); Richard J. Sadvary, Tarentum, PA (US); Shanti Swarup, Allison Park, PA (US); Hongying Zhou, Allison Park, PA (US)

(*) Notice: Subject to any disclaimer, the term of this patent is extended or adjusted under 35 U.S.C. 154(b) by 718 days.

(21) Appl. No.: 16/086,253

(22) PCT Filed: Jan. 19, 2017

(86) PCT No.: PCT/US2017/014062
§ 371 (c)(1),
(2) Date: Sep. 18, 2018

(87) PCT Pub. No.: WO2017/160398
PCT Pub. Date: Sep. 21, 2017

(65) Prior Publication Data
US 2020/0290086 A1 Sep. 17, 2020

Related U.S. Application Data

(60) Provisional application No. 62/310,228, filed on Mar. 18, 2016.

(51) Int. Cl.
| | | |
|---|---|---|
| *B05D 7/00* | (2006.01) | |
| *B05D 3/02* | (2006.01) | |
| *B05D 5/06* | (2006.01) | |
| *B05D 7/14* | (2006.01) | |
| *B05D 7/24* | (2006.01) | |
| *C09D 175/04* | (2006.01) | |
| *C25D 13/04* | (2006.01) | |

(52) U.S. Cl.
CPC .......... *B05D 7/574* (2013.01); *B05D 3/0254* (2013.01); *B05D 5/061* (2013.01); *B05D 7/14* (2013.01); *B05D 7/24* (2013.01); *C09D 175/04* (2013.01); *C25D 13/04* (2013.01)

(58) Field of Classification Search
None
See application file for complete search history.

(56) References Cited

U.S. PATENT DOCUMENTS

| | | | |
|---|---|---|---|
| 3,279,936 A | 10/1966 | Forestek | |
| 4,650,718 A | 3/1987 | Simpson et al. | |
| 4,704,176 A | 11/1987 | Botzman | |
| 4,888,383 A | 12/1989 | Huybrechts | |
| 4,933,056 A | 6/1990 | Corrigan et al. | |
| 4,983,662 A | 1/1991 | Overbeek et al. | |
| 5,147,926 A | 9/1992 | Meichsner et al. | |
| 5,348,997 A | 9/1994 | Kato et al. | |
| 5,472,996 A | 12/1995 | Hayashi et al. | |
| 5,530,043 A | 6/1996 | Zawacky et al. | |
| 5,571,861 A | 11/1996 | Klein et al. | |
| 5,614,582 A | 3/1997 | Hori et al. | |
| 5,709,918 A | 1/1998 | Kimijima et al. | |
| 5,760,107 A | 6/1998 | Valko et al. | |
| 5,814,410 A | 9/1998 | Singer et al. | |
| 5,820,987 A | 10/1998 | Kaufman et al. | |
| 5,891,981 A | 4/1999 | Mauer et al. | |
| 5,912,293 A | 6/1999 | Stockwell et al. | |
| 6,063,861 A | 5/2000 | Irle et al. | |
| 6,239,209 B1 | 5/2001 | Yang et al. | |
| 6,309,494 B1 | 10/2001 | Koch et al. | |
| 6,552,117 B2 | 4/2003 | Moos et al. | |
| 6,555,625 B1 | 4/2003 | Overbeek et al. | |
| 6,579,932 B1 | 6/2003 | Schipper et al. | |
| 6,635,706 B1 | 10/2003 | Petschke et al. | |
| 6,706,818 B2 | 3/2004 | Ishihara et al. | |
| 6,762,240 B2 | 7/2004 | Swarup et al. | |
| 6,765,056 B2 | 7/2004 | Hobel et al. | |
| 7,476,705 B2 | 1/2009 | Pajerski | |

(Continued)

FOREIGN PATENT DOCUMENTS

| | | | |
|---|---|---|---|
| CA | 2219835 A1 | 5/1998 | |
| CN | 101048477 A | 10/2007 | |

(Continued)

OTHER PUBLICATIONS

Hirose et al., "The structure and properties of core-shell type acrylic-polyurethane hybrid aqueous emulsions", Progress in Organic Coatings, 1997, pp. 157-169, vol. 31.
Jin et al., "Better Rubber to Substrate Adhesion via Better Interfacial Chemistry", Presented at the Fall 178th Technical Meeting of the Rubber Division of the American Chemical Society, Inc., Oct. 2010, pp. 1-19.
Kessel et al., "The diacetone acrylamide crosslinking reaction and its influence on the film formation of an acrylic latex", Journal of Coatings Technology and Research, 2008, pp. 285-297, vol. 5:3.
Navarro-Banon et al., "Water-based chlorination treatment of SBS rubber soles to improve their adhesion to waterborne polyurethane adhesives in the footwear industry", Journal of Adhesion Science and Technology, 2005, pp. 947-974, vol. 19:11.

(Continued)

*Primary Examiner* — Michael P. Rodriguez
(74) *Attorney, Agent, or Firm* — Mihael J. Grese

(57) ABSTRACT

A multi-layer coating includes: a first basecoat layer applied over at least a portion of a substrate; and a second basecoat layer applied over the first basecoat layer. The first basecoat layer and second basecoat layer are formed from compositions having a polyhydrazide and core-shell particles dispersed in aqueous mediums. The core-shell particles of the first basecoat composition includes (1) a polymeric core at least partially encapsulated by (2) a polymeric shell comprising urea linkages, and keto and/or aldo functional groups. The polymeric core of the core-shell particles of the first basecoat composition and the second basecoat composition are each independently covalently bonded to at least a portion of the polymeric shell of the core-shell particles.

20 Claims, No Drawings

(56) References Cited

U.S. PATENT DOCUMENTS

| | | |
|---|---|---|
| 7,531,074 B2 | 5/2009 | Purdy et al. |
| 7,576,157 B2 | 8/2009 | Pajerski |
| 8,283,405 B2 | 10/2012 | Yukawa |
| 8,436,084 B2 | 5/2013 | Kawaguchi et al. |
| 8,461,253 B2 | 6/2013 | Ambrose et al. |
| 8,716,402 B2 | 5/2014 | Temple et al. |
| 8,722,788 B2 | 5/2014 | Schultes et al. |
| 8,846,156 B2 | 9/2014 | Swarup et al. |
| 8,900,667 B2 | 12/2014 | Boggs et al. |
| 8,901,244 B2 | 12/2014 | Pajerski |
| 9,102,783 B2 | 8/2015 | Yagi et al. |
| 9,127,125 B2 | 9/2015 | Hartig et al. |
| 9,149,835 B2 | 10/2015 | Swarup et al. |
| 9,303,181 B2 | 4/2016 | Zhang et al. |
| 9,365,729 B2 | 6/2016 | Katsuragi |
| 2001/0024693 A1 | 9/2001 | Morimoto et al. |
| 2002/0157761 A1 | 10/2002 | Bender et al. |
| 2004/0096590 A1 | 5/2004 | Sasaki et al. |
| 2006/0089453 A1 | 4/2006 | Pajerski |
| 2006/0121204 A1 | 6/2006 | Nakae et al. |
| 2006/0148980 A1 | 7/2006 | Tielemans et al. |
| 2007/0276068 A1 | 11/2007 | Hintzer et al. |
| 2009/0117396 A1 | 5/2009 | Furusawa et al. |
| 2010/0174032 A1 | 7/2010 | Temple et al. |
| 2011/0070374 A1 | 3/2011 | Ambrose et al. |
| 2011/0300389 A1 | 12/2011 | Kitagawa et al. |
| 2012/0021228 A1 | 1/2012 | Kitagawa et al. |
| 2014/0242280 A1* | 8/2014 | Swarup .................. B05D 7/52 427/385.5 |
| 2014/0272419 A1 | 9/2014 | Furar et al. |
| 2014/0377468 A1 | 12/2014 | Swarup et al. |
| 2015/0045491 A1 | 2/2015 | Zhang et al. |
| 2015/0083297 A1 | 3/2015 | Inata et al. |
| 2015/0210883 A1 | 7/2015 | Swarup et al. |
| 2015/0267077 A1 | 9/2015 | Janoski, Sr. et al. |
| 2015/0368512 A1 | 12/2015 | Bowman et al. |
| 2016/0068706 A1 | 3/2016 | Swarup et al. |

FOREIGN PATENT DOCUMENTS

| | | |
|---|---|---|
| CN | 101240101 A | 8/2008 |
| CN | 102199254 A | 9/2011 |
| CN | 102492281 A | 6/2012 |
| CN | 103485179 A | 1/2014 |
| CN | 106188563 A | 12/2016 |
| DE | 3016710 A1 | 11/1980 |
| DE | 3416690 A1 | 1/1986 |
| EP | 1454971 B1 | 2/2006 |
| GB | 724054 | 2/1955 |
| GB | 752655 | 7/1956 |
| GB | 1391420 A | 4/1975 |
| JP | 5320299 A | 12/1993 |
| JP | 5339542 A | 12/1993 |
| JP | 782456 A | 3/1995 |
| JP | 7188353 A | 7/1995 |
| JP | 7242855 A | 9/1995 |
| JP | 8309879 A | 11/1996 |
| JP | 10139839 A | 5/1998 |
| JP | 10259356 A | 9/1998 |
| JP | 10264607 A | 10/1998 |
| JP | 10265735 A | 10/1998 |
| JP | 11501586 A | 2/1999 |
| JP | 2000345092 A | 12/2000 |
| JP | 200140272 A | 2/2001 |
| JP | 200140319 A | 2/2001 |
| JP | 2001138459 A | 5/2001 |
| JP | 2001278923 A | 10/2001 |
| JP | 200288215 A | 3/2002 |
| JP | 3501417 B2 | 3/2004 |
| JP | 2005264136 A | 9/2005 |
| JP | 200656973 A | 3/2006 |
| JP | 20081779 A | 1/2008 |
| JP | 201126463 A | 2/2011 |
| JP | 2012101611 A | 5/2012 |
| JP | 2012101612 A | 5/2012 |
| JP | 5189694 B1 | 4/2013 |
| JP | 2014129484 A | 7/2014 |
| RU | 2254351 C2 | 6/2005 |
| RU | 2007122279 A | 12/2008 |
| RU | 2439103 C2 | 1/2012 |
| WO | 9747401 A1 | 12/1997 |
| WO | 2011127641 A1 | 10/2011 |
| WO | 2015030955 A1 | 3/2015 |

OTHER PUBLICATIONS

Okamoto et al., "Urethane/acrylic composite polymer emulsions", Progress in Organic Coatings, 1996, pp. 175-182, vol. 29.

Zhang et al., "The Diacetone Acrylamide Crosslinking Reaction and Its Control of Core-Shell Polyacrylate Latices at Ambient Temperature", Journal of Applied Polymer Science, 2012, pp. 1822-1832, vol. 123.

"Handbook of Polyurethane Elastomers", 1st Edition, Shanxi Institute of Chemical Industry, pp. 44-46, Chemical Industry Press. (Relevant for reasons provided in the Chinese Office Action).

* cited by examiner

MULTI-LAYER COATINGS AND METHODS OF PREPARING THE SAME

CROSS REFERENCE TO RELATED APPLICATIONS

This application claims the benefit of U.S. Provisional Application No. 62/310,228 filed Mar. 18, 2016, which is incorporated herein by reference in its entirety.

NOTICE OF GOVERNMENT SUPPORT

This invention was made with Government support under Contract No. DE-EE0005777 awarded by the Department of Energy. The United States government may have certain rights in this invention.

FIELD OF THE INVENTION

The present invention relates to multi-layer coatings that can be applied to substrates such as automotive substrates and methods of preparing and applying such coatings.

BACKGROUND OF THE INVENTION

Multi-layer coatings are applied to a wide variety of substrates to provide color and other visual effects, corrosion resistance, abrasion resistance, chemical resistance, and the like. For example, multi-layer coatings often include a basecoat layer that provides color or other visual special effects and a topcoat layer that provides an abrasion and scratch resistant layer. With respect to multi-layer coatings applied to metal substrates such as automotive substrates, a primer layer and primer surfacer layer are also typically included. Generally, each layer of the multi-layer coating is separately dehydrated and/or cured under varying conditions such as at different temperatures to form the final multi-layer coating. It is still desirable to provide new multi-layer coatings that also provide low cure temperatures and a reduced number of layers.

SUMMARY OF THE INVENTION

The present invention is directed to a multi-layer coating that comprises: a first basecoat layer applied over at least a portion of a substrate; and a second basecoat layer applied over the first basecoat layer. The first basecoat layer is formed from a first basecoat composition comprising a polyhydrazide and core-shell particles dispersed in an aqueous medium. The core-shell particles of the first basecoat composition comprise (1) a polymeric core at least partially encapsulated by (2) a polymeric shell comprising urea linkages, and keto and/or aldo functional groups. Further, the second basecoat layer is formed from a second basecoat composition comprising a polyhydrazide and core-shell particles dispersed in an aqueous medium. The core-shell particles of the second basecoat composition comprise (1) a polymeric core at least partially encapsulated by (2) a polymeric shell. In addition, the polymeric core of the core-shell particles of the first basecoat composition and the second basecoat composition are each independently covalently bonded to at least a portion of the polymeric shell of the core-shell particles.

The present invention is also directed to a process of coating a substrate with a multi-layer coating comprising: forming a first basecoat layer over at least a portion of a substrate by depositing a first basecoat composition directly onto at least a portion of the substrate; and forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated. The first basecoat layer is formed from a first basecoat composition comprising a polyhydrazide and core-shell particles dispersed in an aqueous medium. The core-shell particles of the first basecoat composition comprise (1) a polymeric core at least partially encapsulated by (2) a polymeric shell having urea linkages, and keto and/or aldo functional groups. Further, the second basecoat layer is formed from a second basecoat composition comprising a polyhydrazide and core-shell particles dispersed in an aqueous medium, the core-shell particles of the second basecoat composition comprise (1) a polymeric core at least partially encapsulated by (2) a polymeric shell. In addition, the polymeric core of the core-shell particles of the first basecoat composition and the second basecoat composition are each independently covalently bonded to at least a portion of the polymeric shell of the core-shell particles.

DESCRIPTION OF THE INVENTION

The present invention is directed to a multi-layer coating that comprises at least a first basecoat layer and a second basecoat layer. A "basecoat" refers to a coating that is deposited onto a primer and/or directly onto a substrate, optionally including components (such as pigments) that impact the color and/or provide other visual impact. As explained in further detail, the multi-layer coating can include additional coating layers including, but not limited to, a topcoat layer. A "topcoat" refers to an uppermost coating that is deposited over another coating layer such as a basecoat to provide a protective and/or decorative layer.

The first basecoat layer can be formed from a coating composition that comprises aqueous dispersed core-shell particles. Thus, the first basecoat composition comprises a dispersion of core-shell particles (the dispersed phase) in an aqueous medium (the continuous phase). As used herein, an "aqueous medium" refers to a liquid medium comprising at least 50 weight % water, based on the total weight of the liquid medium. Such non-aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

The aqueous dispersed core-shell particles of the present invention can comprise a core that is at least partially encapsulated by the shell. A core-shell particle in which the core is at least partially encapsulated by the shell refers to a particle comprising (i) at least a first material that forms the center of the particle (i.e., the core) and (ii) at least a second material (i.e., the shell) that forms a layer over at least a portion of the surface of the first material (i.e., the core). In some examples, at least a portion of the shell directly contacts at least a portion of the core. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

The core-shell particles can comprise a polymeric core as well as a polymeric shell. A "polymeric core" means that the core of the core-shell particle comprises one or more polymers and a "polymeric shell" means that the shell of the core-shell particle comprises one or more polymers. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

The polymeric core can comprise a (meth)acrylate polymer, a vinyl polymer, or a combination thereof. As used herein, the term "(meth)acrylate" refers to both the methacrylate and the acrylate. Moreover, the backbone or main chain of a polymer that forms at least a portion of the polymeric shell can comprise urea linkages and, optionally, other linkages. For instance, the polymeric shell can comprise a polyurethane with a backbone that includes urethane linkages and urea linkages. The polymeric shell comprising urea linkages, such as the previously mentioned polyurethane, can also comprise additional linkages including, but not limited to, ester linkages, ether linkages, and combinations thereof.

The polymeric core and polymeric shell can also comprise one or more, such as two or more, reactive functional groups. The term "reactive functional group" refers to an atom, group of atoms, functionality, or group having sufficient reactivity to form at least one covalent bond with another co-reactive group in a chemical reaction. At least some of the reactive functional groups of the polymeric shell are keto functional groups (also referred to as ketone functional groups), aldo functional groups (also referred to as aldehyde functional groups), or combinations thereof. Optionally, the polymeric core also comprises reactive functional groups such as keto functional groups, aldo functional groups, or combinations. Alternatively, the polymer core is free of reactive functional groups such as keto functional groups and aldo functional groups.

Other non-limiting examples of reactive functional groups that can be formed on the polymeric shell and/or polymeric core include carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. It is appreciated that the polymeric shell, polymeric core, or both can be free of (i.e., does not contain) any of the previously described reactive functional groups.

The polymeric core and polymeric shell of the core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

The water-dispersible groups can be formed from hydrophilic functional groups. For example, the polymer can comprise carboxylic acid functional groups, such as by using a carboxylic acid group containing diols to form the polymeric shell. The carboxylic acid functional groups can be at least partially neutralized (i.e., at least 30 percent of the total neutralization equivalent) by an inorganic base, such as a volatile amine, to form a salt group. Examples of suitable amines are ammonia, dimethylamine, trimethylamine, monoethanolamine, and dimethylethanolamine. It is appreciated that the amines will evaporate during the formation of the coating to expose the carboxylic acid functional groups and allow the carboxylic acid functional groups to undergo further reactions such as with a crosslinking agent reactive with the carboxylic acid functional groups. Other non-limiting examples of water-dispersible groups include polyoxyalkylene groups.

In some examples, the polymeric shell comprises a polyurethane with pendant and/or terminal keto and/or aldo functional groups as well as pendant and/or terminal carboxylic acid functional groups. As previously described, the carboxylic acid functional groups can be at least partially neutralized (i.e., at least 30 percent of the total neutralization equivalent) by an inorganic base, such as a volatile amine, to form a salt group as previously described. Further, the polymeric core can be a hydrophobic core that is free of such carboxylic acid groups and salt groups formed therefrom. A "pendant group" refers to a group that is an offshoot from the side of the polymer backbone and which is not part of the polymer backbone. In contrast, a "terminal group" refers to a group on an end of the polymer backbone and which is part of the polymer backbone.

The polymeric shell can also be covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles of the present invention. For example, the core-shell particles can be formed from isocyanate functional polyurethane prepolymers, polyamines, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, and carboxylic acids. The polyurethane prepolymer can also be prepared with keto and/or aldo functional monoalcohols.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Examples of polyols that can be used to prepare the polyurethane based polymer include, but are not limited to, lower molecular weight glycols, polyether polyols, polyester polyols, copolymers thereof, and combinations thereof. Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof. Non-limiting examples of polyester polyols include those prepared from a polyol comprising an ether moiety and a carboxylic acid or anhydride.

Other suitable polyols include, but are not limited to, 1,6-hexanediol, cyclohexanedimethanol, 2-ethyl-1,6-hexanediol, 1,4-butanediol, ethylene glycol, propylene glycol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, glutaric acid, succinic acid, malonic acid, oxalic acid, phthalic acid, isophthalic acid, hexahydrophthalic acid, adipic acid, maleic acid, and mixtures thereof. Further, non-limiting examples of acid containing diols include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Examples of keto functional monoalcohols include, but are not limited to, hydroxyacetone, 4-hydroxy-2-butanone, 5-hydroxy-4-octanone, 4-hydroxy-4-methylpentan-2-one which is also referred to as diacetone alcohol, 3-hydroxyacetophenone, and combinations thereof. Further, non-limiting examples of aldo functional monoalcohols include D-Lactaldehyde solution, aldol, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Non-limiting examples of hydroxyalkyl esters of (meth)acrylic acid include hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. For example, the polyurethane prepolymer can be formed by reacting a diisocyanate, a polyol, a carboxyl group-containing diol, a hydroxyl group-containing ethylenically unsaturated monomer, and, optionally, a keto functional monoalcohol simultaneously.

The polyurethane prepolymers can also be prepared in the presence of catalysts, polymerization inhibitors, and combinations thereof. Non-limiting examples of catalysts include triethylamine, N-ethyl morpholine, triethyldiamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

As previously mentioned, the core-shell particles can also be prepared with polyamines and ethylenically unsaturated monomers not incorporated into the polyurethane during preparation thereof. For instance, the isocyanate functional polyurethane prepolymers can be prepared as described above and then reacted with polyamines as a chain extender. As used herein, a "chain extender" refers to a lower molecular weight compound having two or more functional groups that are reactive towards isocyanate.

Suitable polyamines that can be used to prepare the polyurethane based polymer include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. Suitable polyamines are also sold by Huntsman under the trade name JEFFAMINE®, such as JEFFAMINE® D-230 and JEFFAMINE® D-400.

Other non-limiting examples of suitable polyamine functional compounds include the Michael addition reaction products of a polyamine functional compound, such as a diamine, with keto and/or aldo containing ethylenically unsaturated monomers. The polyamine functional compound typically comprises at least two primary amino groups (i.e., a functional group represented by the structural formula —$NH_2$), and the keto and/or aldo containing unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbon) and at least two keto and/or aldo functional groups. It is appreciated that the secondary amino groups will react with the isocyanate functional groups of the polyurethane prepolymers to form urea linkages and chains extend the polyurethanes. Further, the keto and/or aldo functional groups will extend out from the backbone of the chain-extended polyurethane, such as from the nitrogen atom of the urea linkage, for example, to form a polyurethane with pendant keto and/or aldo functional groups.

After reacting the polyurethane prepolymers and polyamines, the chain extended polyurethane and additional ethylenically unsaturated monomers can be subjected to a polymerization process to form the core-shell particles. The additional ethylenically unsaturated monomers can be added after forming the polyurethane. Alternatively, the additional ethylenically unsaturated monomers can be used as a diluent during preparation of the polyurethane prepolymer and not added after formation of the polyurethane. It is appreciated that ethylenically unsaturated monomers can be used as a diluent during preparation of the polyurethane prepolymer and also added after formation of the polyurethane.

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth)acrylic acid and keto and aldo containing unsaturated monomers include any of those previously described. Non-limiting examples of acid group containing unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

As previously noted, the ethylenically unsaturated monomers can be polymerized in the presence of the polyurethane, which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

In some examples, the core-shell particles of the present invention are prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto and/or aldo containing unsaturated monomers. The resulting core-shell particles comprise a polymeric core prepared from ethylenically unsaturated monomers that is covalently bonded to at least a portion of a polyurethane shell having pendant carboxylic acid functional groups, pendant keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

The core-shell particles of the present invention can also be prepared with: (i) ethylenically unsaturated monomers; (ii) polyurethane prepolymers comprising isocyanate functional groups, carboxylic acid functional groups, terminal keto and/or aldo functional groups, and ethylenically unsaturated groups; and (iii) a diamine. The resulting core-shell particles comprise a polymeric core prepared from ethylenically unsaturated monomers and a polyurethane shell having pendant carboxylic acid functional groups, terminal keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

Further, the polymeric core is covalently bonded to at least a portion of the polymeric shell. For example, the polymeric shell of the core-shell particles can be at least partially formed from a chain extended polyurethane prepared from: (a) a first polyurethane prepolymer comprising a terminal isocyanate functional group, pendant carboxylic acid functional groups, and a terminal keto and/or aldo functional group; (b) a second polyurethane prepolymer comprising a terminal isocyanate functional group, pendant carboxylic acid functional groups, and a terminal ethylenically unsaturated group; and (c) a diamine that reacts with both the first and second polyurethane prepolymers. The ethylenically unsaturated monomers can then be polymerized in the presence of the polyurethane to form the polymeric core-shell particles in which the polymeric core is covalently bonded to at least a portion of the polymeric shell.

It is appreciated that any combination of core-shell particles described herein can be dispersed in an aqueous medium to form a latex. As used herein, a "latex", with respect to the aqueous dispersed core-shell particles, refers to an aqueous colloidal dispersion of polymeric particles.

The core-shell particles can comprise at least 20 weight %, at least 30 weight %, at least 40 weight %, at least 50 weight %, or at least 60 weight % of the first basecoat composition, based on the total solids weight of the first basecoat composition. The core-shell particles can comprise up to 99 weight %, up to 95 weight %, up to 90 weight %, up to 80 weight %, or up to 70 weight % of the basecoat composition, based on the total solids weight of the first basecoat composition. The core-shell particles can also comprise a range such as from 20 to 99 weight %, or from 40 to 95 weight %, or from 60 to 90 weight % of the first basecoat composition, based on the total solids weight of the first basecoat composition.

The first basecoat composition can also comprise one or more crosslinkers that are dispersed in the aqueous medium with the core-shell particles. As used herein, the term "crosslinker" refers to a molecule comprising two or more functional groups that are reactive with other functional groups and which is capable of linking two or more monomers or polymer molecules through chemical bonds. Non-limiting examples of crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof.

The crosslinker(s) can react with the core-shell particles to cure the first basecoat composition. The terms "curable", "cure", and the like mean that at least a portion of the resinous materials in a composition is crosslinked or crosslinkable. Cure or the degree of cure can be determined by dynamic mechanical thermal analysis (DMTA) using a Polymer Laboratories MK III DMTA analyzer conducted under nitrogen. The degree of cure can be at least 10%, such as at least 30%, such as at least 50%, such as at least 70%, or at least 90% of complete crosslinking as determined by the analysis mentioned above.

Further, curing can occur at ambient conditions, with heat, or with other means such as actinic radiation. "Ambient conditions" refers to the conditions of the surrounding environment such as the temperature, humidity, and pressure of the room or outdoor environment. For example, the first basecoat composition can be cured at ambient room temperature (about 20° C. to 25° C.). Further, the term "actinic radiation" refers to electromagnetic radiation that can initiate chemical reactions. Actinic radiation includes, but is not limited to, visible light, ultraviolet (UV) light, infrared and near-infrared radiation, X-ray, and gamma radiation.

The first basecoat composition can comprise at least one crosslinker that is reactive with the keto and aldo functional groups on the polymeric shell of the core-shell particles. The crosslinker can also react with keto and aldo functional groups that can be present on the polymeric core of the core-shell particles. For instance, the first basecoat composition can comprise a polyhydrazide (a material containing two or more hydrazide groups) that is reactive with the keto and aldo functional groups on the polymeric shell of the core-shell particles. The polyhydrazides can include non-polymeric polyhydrazides, polymeric polyhydrazides, or combinations thereof. Non-limiting examples of suitable non-polymeric polyhydrazides include maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, compounds containing carboxylic acids such as diols containing carboxylic acids, and, optionally, polyamines. Non-limiting examples of these compounds include any of those previously described with respect to the polyurethane prepolymer of the core-shell particles.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an inorganic base to form a salt group and enhance the water-dispersibility/stability of the polyurethane. The polyurethane prepolymer can also be free of any of the additional functional groups and can only include hydrazide functional groups and, optionally, carboxylic acid functional groups or other water-dispersible groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with hydrazine and/or polyhydrazide compounds to form a water-dispersible polyhydrazide functional polyurethane. The hydrazine and polyhydrazide compounds can also chain extend the isocyanate functional polyurethane prepolymer. Non-limiting examples of polyhydrazide compounds that can be reacted with the isocyanate functional polyurethane prepolymer include any of the non-polymeric hydrazide functional compounds previously described.

The polymeric polyhydrazides can also comprise core-shell particles comprising a polymeric core at least partially encapsulated by a polymeric shell having two or more hydrazide functional groups. The polyhydrazide functional core-shell particles can be prepared by reacting polyurethane prepolymers having isocyanate and ethylenically unsaturated functional groups with hydrazine and/or polyhydrazide compounds and ethylenically unsaturated monomers and/or polymers. In some examples, the polyhydrazide functional core-shell particles are prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (for example, carboxylic acid functional groups) and/or linkages (for example, ester linkages and/or ether linkages) as previously described with respect to polyurethane shells. The hydrazide functional core-shell particles can be also free of additional functional groups and linkages such as any of those previously described herein. It is appreciated that the hydrazide functional core-shell particles are free of keto and aldo functional groups.

It was found that polymeric polyhydrazides, such as polyhydrazide functional polyurethanes, can provide improved properties as compared to non-polymeric polyhydrazide compounds when used to crosslink the keto and/or aldo functional core-shell particles of the present invention. For example, polymeric polyhydrazides have been found to provide improved hardness and water resistance in the final coating as compared to non-polymeric polyhydrazide compounds. It was also found that polyhydrazide functional polyurethanes prepared with hydrazine exhibit improved properties as compared to polyhydrazide functional polyurethanes prepared with polyhydrazide compounds.

The first basecoat composition can comprise a non-polymeric hydrazide functional compound, a polymeric hydrazide functional compound, or a combination thereof. When polymeric hydrazides are used, the polymeric hydrazides can include the linear or branched polyhydrazide functional polymers, the polyhydrazide functional core-shell particles, or a combination thereof.

The first basecoat composition can also comprise at least two different types of crosslinkers that are reactive with the keto and aldo functional groups and/or additional functional groups that may be present on the core-shell particles such as carboxylic acid functional groups. In some examples, the first basecoat composition comprises a polyhydrazide reactive with the keto and/or aldo functional group, such as any of those previously described, and a carbodiimide reactive with carboxylic acid functional groups. Non-limiting examples of suitable carbodiimides are described in U.S. Patent No. 2011/0070374, which is incorporated by reference herein in its entirety.

In addition, the first basecoat composition can comprise additional materials including, but not limited to, additional resins such as additional film-forming resins. As used herein, a "film-forming resin" refers to a resin that can form a self-supporting continuous film on at least a horizontal surface through dehydration and/or upon curing. The term "dehydration" refers to the removal of water and/or other solvents. It is appreciated that dehydration can also cause at least partial curing of a resinous material such as the core-shell particles and additional resins described herein. The additional resin can be dehydrated and/or cured at ambient conditions, with heat, or with other means such as actinic radiation as previously described.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, copolymers thereof, and mixtures thereof.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. The crosslinkers can include any of those previously described. Alternatively, a thermosetting film-forming resin can be used having functional groups that are reactive with themselves; in this manner, such thermosetting resins are self-crosslinking.

The first basecoat composition can also include additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The colorant used with the first basecoat composition can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of materials that can be used with the first basecoat composition include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

The first basecoat composition can be deposited directly over at least a portion of a substrate or directly over at least a portion of an optional primer coating layer, which is explained in further detail herein, and, optionally, dehydrated and/or cured to form the first basecoat layer. The first basecoat composition and the other compositions of the remaining coating layers of the multi-layer coating can be applied to a wide range of substrates known in the coatings industry. For example, the first basecoat composition and other compositions of the remaining coating layers of the multi-layer coating can be applied to automotive substrates, industrial substrates, aerocraft and aeroeraft components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect, a protective pretreatment or other coating layer, and the like.

The first basecoat composition and other compositions of the remaining coating layers of the multi-layer coating of the present invention are particularly beneficial when applied to a metallic substrate. For example, the coatings of the present invention are particularly beneficial when applied to metallic substrates that are used to fabricate automotive vehicles, such as cars, trucks, and tractors.

The first basecoat composition can be applied directly over at least a portion of the substrate or a primer coating layer by any means standard in the art, such as spraying, electrostatic spraying, dipping, rolling, brushing, and the like. Once applied, the composition can be dehydrated and/or cured to form the first basecoat layer. The coating composition can be dehydrated and/or cured at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C.

After the first basecoat layer is applied over the substrate, a second basecoat layer can be formed over at least a portion of the first basecoat layer. The second basecoat layer can provide additional coating thickness and coating properties without undesirable flow obtained when using a single layer to achieve the same result. The second basecoat layer can be formed from a coating composition that comprises aqueous dispersed core-shell particles. The aqueous dispersed core-shell particles can comprise any of the core-shell particles previously described with respect to the first basecoat layer. For instance, the second basecoat layer can comprise the same aqueous dispersed core-shell particles in the first basecoat layer. Alternatively, the second basecoat layer can comprise any of the aqueous dispersed core-shell particles previously described but which are different than the aqueous dispersed core-shell particles of the first basecoat layer.

The second basecoat composition can also comprise core-shell particles that are different than those previously described. For example, the core-shell particles of the second basecoat layer can include a polymeric core comprising: (i) a (meth)acrylate polymer, a vinyl polymer, or a combination thereof; and (ii) keto and/or aldo functional groups. Moreover, the backbone or main chain of the polymer that forms at least a portion of the polymeric shell can comprise urethane linkages and, optionally, other linkages such as ester linkages, ether linkages, and combinations thereof. Thus, the polymeric core can comprise keto and/or aldo functional groups, and the polymeric shell can comprise a polyurethane that is free of keto and/or aldo functional groups and, optionally, free of urea linkages. It is appreciated that such core-shell particles can be prepared with similar materials as described above with respect to the first basecoat layer.

In some examples, the second basecoat composition comprises core-shell particles that are different than those previously described with respect to the first basecoat composition and are prepared with: (i) ethylenically unsaturated monomers comprising keto and/or aldo functional groups; and (ii) polyurethane prepolymers comprising isocyanate functional groups, carboxylic acid functional groups, and ethylenically unsaturated groups. The resulting core-shell particles comprise a keto and/or aldo functional polymeric core that is covalently bonded to at least a portion of a polyurethane shell having pendant carboxylic acid functional groups and urethane linkages. Further, the polyurethane shell is free of keto and/or aldo functional groups as well as urea linkages.

The second basecoat composition can also comprise any of the previously described additional resins, crosslinkers, colorants, and/or other optional materials. For example, the second basecoat composition can further comprise a polyhydrazide reactive with keto and/or aldo functional groups, a carbodiimide reactive with carboxylic acid functional groups, and colorants. When the second basecoat composition includes polyhydrazides, the polyhydrazides can be chosen from non-polymeric hydrazides, polymeric hydrazides, and combination thereof. Further, when the first basecoat composition comprises a hydrazide functional compound, the second basecoat composition can comprise the same or different hydrazide functional compound(s). For instance, the first basecoat composition can include a polymeric hydrazide functional compound while the second basecoat composition can include a non-polymeric hydrazide functional compound.

As indicated, the second basecoat layer can comprise colorants. In some examples, the second basecoat composition can comprise special effect pigments and the first basecoat layer can be free of special effect pigments. As such, the first basecoat layer can only comprise pigments that impart a continuous unchanging color and the second basecoat layer can only comprise special effect pigments.

The second basecoat composition can be applied directly over at least a portion of the first basecoat composition as a wet-on-wet process, i.e. prior to dehydration of the first basecoat composition. The second basecoat composition can be applied by any means standard in the art, such as spraying, electrostatic spraying, dipping, rolling, brushing, and the like. After the second basecoat composition is applied, both basecoat compositions can be dehydrated and/or cured simultaneously. Both basecoat compositions can be dehydrated and/or cured simultaneously at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C.

The second basecoat composition can also be applied directly over at least a portion of the dehydrated and/or cured first basecoat layer. The second basecoat composition can then be dehydrated and/or cured at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C.

After the basecoat layers have been dehydrated and/or cured, a topcoat layer can be applied over at least a portion of the second basecoat layer. The topcoat layer can be formed from a coating composition that comprises a film-forming resin, a crosslinker, an aqueous or non-aqueous solvent medium, and/or any of the other materials such as those previously described. In comparison to an aqueous medium, a "non-aqueous medium" comprises less than 50 weight % water, or less than 40 weight % water, or less than 30 weight % water, or less than 20 weight % water, or less than 10 weight % water, or less than 5 weight % water, based on the total weight of the liquid medium. The solvents that make up 50 weight % or more of the liquid medium can include, but are not limited to, any of the organic solvents previously described. Conditions used to cure the topcoat layer are dependent on the components in the topcoat composition. For instance, the topcoat composition can comprise components that will cure at a temperature of 80° C. to 150° C.

The topcoat layer used with the multi-layer coating of the present invention can be a clear topcoat layer. As used herein, a "clear coating layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

Non-limiting examples of topcoat layers that can be used with the multi-layer coating of the present invention include those described in U.S. Pat. No. 4,650,718 at col. 1 line 62 to col. 10 line 16; U.S. Pat. No. 5,814,410 at col. 2 line 23 to col. 9 line 54; and U.S. Pat. No. 5,891,981 at col. 2 line 22 to col. 12 line 37, all of which are incorporated by reference herein. Suitable topcoat coating compositions that can be used to form the topcoat layer also include those commercially available from PPG Industries, Inc. under the trademarks NCT®, DIAMOND COAT®, and CERAMICLEAR®.

The multi-layer coating can also comprise other layers including, but not limited to, additional basecoat layers as well as a primer coating layer as indicated above. As used herein, a "primer coating layer" refers to an undercoating that may be deposited onto a substrate in order to prepare the surface for application of a protective or decorative coating system. The primer coating layer can be formed over at least a portion of the substrate and the first basecoat layer can be formed over at least a portion of the primer coating layer. Further, the additional basecoat layers can be prepared from any of the core-shell particles and other materials previously described. The additional basecoat layers can be applied, for example, over the second basecoat layer before applying the topcoat layer.

The primer coating layer used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), Chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of the primer coating composition can be selected to form an electrodepositable coating composition. An "electrodepositable coating composition" refers to a coating composition that is capable of being deposited onto an electrically conductive substrate under the influence of an applied electrical potential. Non-limiting examples of electrodepositable coating compositions include conventional anionic and cationic electrodepositable coating compositions, such as epoxy or polyurethane-based coatings. Suitable electrodepositable coatings are disclosed in U.S. Pat. No. 4,933,056 at col. 2 line 48 to col. 5 line 53; U.S. Pat. No. 5,530,043 at col. 1 line 54 to col. 4 line 67; U.S. Pat. No. 5,760,107 at col. 2 line 11 to col. 9 line 60; and U.S. Pat. No. 5,820,987 at col. 3 line 48 to col. 10 line 63, all of which are incorporated by reference herein. Suitable electrodepositable coating compositions also include those commercially available from PPG Industries, Inc. such as ED 6280, ED 6465, and ED 7000, for example.

As indicated, the primer coating composition can be deposited directly over at least a portion of a substrate before application of the first basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

The present invention is also directed to a method of applying a multi-layer coating to a substrate. The method can comprise: forming a first basecoat layer over at least a portion of a substrate by depositing a first basecoat composition directly onto at least a portion of the substrate; forming a second basecoat layer over at least a portion of the first basecoat layer by depositing a second basecoat composition directly onto at least a portion of: (1) the first basecoat layer after the first basecoat composition is dehydrated and/or cured; or (2) the first basecoat composition before the first basecoat composition is dehydrated and/or cured. The first and second basecoat compositions can be dehydrated and/or cured separately or simultaneously at ambient temperatures (about 20° C. to 25° C.) to 140° C., or from ambient temperatures to 120° C., or from ambient temperatures to 100° C., or from ambient temperatures to 90° C., or from 40° C. to 80° C., or from 50° C. to 80° C. Optionally, the method also comprises forming a topcoat layer over at least a portion of the second basecoat layer by depositing a topcoat composition directly onto at least a portion of the second basecoat layer.

In some examples, the substrate comprises a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can also be applied to automotive parts in an automotive assembly plant. During application of the multi-layer coating in an automotive assembly plant, a metal substrate is optionally first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

A drying device, such as an oven or flash chamber, can be located downstream of and/or adjacent to the first basecoat station to optionally dehydrate and/or cure the first basecoat layer. Thus, the first basecoat composition can be dehydrated and/or cured before continuing on to the next coating phase. Alternatively, the first basecoat composition is not dehydrated and/or cured before continuing on to the next coating phase.

A second basecoat station can be located downstream of and/or adjacent to the first basecoat station and can have one or more conventional applicators, e.g., bell or gun applicators, connected to and in flow communication with a source of the second basecoat composition. The second basecoat composition can be applied, e.g., sprayed, over the first basecoat composition by one or more applicators in one or more spray passes as a wet-on-wet process if the first basecoat composition was not previously dehydrated and/or cured. Alternatively, the second basecoat composition can be applied, e.g., sprayed, over the first basecoat layer by one or more applicators in one or more spray passes after the first basecoat composition was dehydrated and/or cured.

The second basecoat can be dehydrated and/or cured with a conventional drying device, such as an oven, located downstream of and/or adjacent to the second coating station and/or the first coating station. The second basecoat layer can be dehydrated and/or cured separately when the first basecoat layer has been previously dehydrated and/or cured. Alternatively, when the second basecoat composition is applied wet-on-wet to the first basecoat composition, both basecoat compositions can be simultaneously dehydrated and/or cured.

After the first basecoat composition and second basecoat composition have been dehydrated and/or cured, one or more conventional topcoat layers can be applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition.

A non-limiting example of an automotive assembly plant for applying a multi-layer coating is described in U.S. Pat. No. 8,846,156 at col. 3 line 1 to col. 4 line 43 and FIG. 1, which is incorporated by reference herein.

It was found that the multi-layer coatings of the present invention can be formed at lower dehydration/cure temperatures than those typically required in other coatings commonly applied to automotive substrates. The multi-layer coatings also eliminate solvent migration between layers and the need of a primer-surfacer layer. As such, the multi-layer coatings of the present invention help reduce costs, eliminate the amount of coating equipment, and speed up the overall coating process.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" multi-layer coating, "a" basecoat, "a" topcoat, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

Example 1

Preparation of a Latex Having Keto Functional Core-Shell Particles

Part A: A polyurethane was first prepared by charging the following components in order into a four necked round bottom flask fitted with a thermocouple, mechanical stirrer, and condenser: 270 grams of butyl acrylate, 213.84 grams of hydroxyethyl methacrylate (HEMA), 4.1 grams of 2,6-di-tert-butyl 4-methyl phenol, 2.1 grams of triphenyl phosphite, 2.1 grams of dibutyl tin dilaurate, 1093.5 grams of polytetrahydrofuran with a number average molecular weight of 1000 g/mol, 242.5 grams of dimethylol propionic acid (DMPA), and 10.8 grams of triethylamine. The mixture was heated to 90° C. and held for 15 minutes. Next, 636.0 grams of isophorone diisocyanate was then charged into the flask over 90 minutes. After adding the isocyanate, the isocyanate adding funnel was rinsed with 54 grams of butyl acrylate. The mixture was held at 90° C. until all of the isocyanate infrared peaks were gone. Once the infrared peaks were gone, 1215 grams of butyl acrylate were charged into the flask, and cooled to ambient temperature. The resulting polyurethane had an acid value of 25.9 mg KOH/g, and a weight average molecular weight of 6,953 g/mol. The weight average molecular weight was determined by gel permeation chromatography versus a polystyrene standard with tetrahydrofuran as the mobile phase. The acid value was measured by titration with 0.1N KOH solution.

Part B: A latex comprising polyurethane-acrylic core-shell particles with keto functionality on the acrylic core and pendant carboxylic acid functionality on the polyurethane shell was prepared by charging the following components in order into a four necked round bottom flask fitted with a thermocouple, mechanical stirrer, and condenser: 4500 grams of deionized water, 67.3 grams of AEROSOL® OT-75 (surfactant, commercially available from Cytec), 25.4 grams of Reasoap SR-10 (reactive emulsifier, commercially available from Adeka Corp.), 73.7 grams of dimethyl ethanolamine, 1713 grams of the polyurethane prepared in Part A, 437 grams of methyl methacrylate, 252 grams of diacetone acrylamide, and 168 grams of hexanediol diacrylate. The mixture was heated to 36° C. and held for 30 minutes with a $N_2$ blanket. A mixture of 5.8 grams of t-butylhydroperoxide and 126 grams of deionized water was then charged into the flask and mixed for 15 minutes. Next, a mixture of 0.06 grams of ferrous ammonium sulfate, 3.2 grams of sodium metabisulfite, and 126 grams of deionized water was charged into the flask over 30 minutes. After peak exotherm, the system was held at 65° C. for one hour. Once the mixture was cooled to 45° C., 29.5 grams of ACTICIDE® MBS (microbiocide formed of a mixture of 1,2-benzisothiazolin-3-one and 2-methyl-4-isothiazolin-3-one, commercially available from Thor GmbH), 1.5 grams of FOAMKILL® 649 (non-silicone defoamer, commercially available from Crucible Chemical Company), and 13 grams of deionized water were charged into the flask and mixed for 15 minutes. The resulting latex had a solid content of 37.1% and an average particle size of 122 nanometers (nm). The average particle size was determined with a Zetasizer 3000HS following the instructions in the Zetasizer 3000HS manual.

Example 2

Preparation of a Latex Having Keto Functional Core-Shell Particles

Part A: A polyurethane was first prepared by charging the following components into a four necked round bottom flask fitted with a thermocouple, mechanical stirrer, and condenser: 103.0 grams of butyl acrylate, 82.8 grams of FOMREZ® 66-56 (hydroxyl terminated saturated linear polyester polyol, commercially available from Chemtura), 82.8 grams of POLYMEG® 2000 polyol (polytetramethylene ether glycol, commercially available from LyondellBasell), 27.0 grams of 3-hydroxyacetophenone, 0.6 grams of 2,6-di-tert-butyl 4-methyl phenol, 7.9 grams of hydroxyethyl methacrylate (HEMA), 27.5 grams of dimethylol propionic acid (DMPA), and 1.2 grams of triethylamine. The mixture was heated to 50° C. and held for 15 minutes. After heating the mixture, 135.0 grams of isophorone diisocyanate was charged into the flask over 10 minutes and mixed for 15 minutes. Next, 7.4 grams of butyl acrylate and 0.31 grams of dibutyl tin dilaurate (DBTDL) was charged into the flask. Immediate exotherm was observed. After exotherm subsided, the mixture was heated to 90° C. and held for 90 minutes. The mixture was then cooled to 70° C., and 103.0 grams of methyl methacrylate and 18.0 grams of hexanediol diacrylate were charged into the flask. The mixture was kept at 60° C. before being dispersed into water.

Part B: A latex comprising polyurethane-acrylic core-shell particles with urea linkages, urethane linkages, pendant carboxylic acid functionality, and terminal keto functionality on the polyurethane shell was prepared by first charging the following components into a four necked round bottom flask fitted with a thermocouple, mechanical stirrer, and condenser: 4000 grams of deionized water, 94.2 grams of dimethyl ethanolamine, and 55.6 grams of ethylenediamine. The mixture was heated to 50° C. and held for 30 minutes with an $N_2$ blanket. After heating the mixture, 2880 grams of the polyurethane prepared in part A was dispersed into the flask over 20 minutes and mixed for an additional 15 minutes. A mixture of 8.4 grams of ammonium persulfate and 250.0 grams deionized water was charged into the flask over 15 minutes. The temperature rose from 50° C. to 73° C.

due to polymerization exotherm. The mixture was then held at 75° C. for an additional hour. After being cooled to 40° C., 2.0 grams of FOAMKILL® 649 (non-silicone defoamer, commercially available from Crucible Chemical Company), 26 grams of ACTICIDE® MBS (microbiocide formed of a mixture of 1,2-benzisothiazolin-3-one and 2-methyl-4-isothiazolin-3-one, commercially available from Thor GmbH), and 60.0 grams of deionized water were charged and mixed for an additional 15 minutes. The resulting latex had a solid content of 39.2% and an average particle size of 67 nm. The average particle size was determined with a Zetasizer 3000HS following the instructions in the Zetasizer 3000HS manual.

Example 3

Preparation of a Latex Having Keto Functional Core-Shell Particles

Part A: A polyurethane was first prepared by charging the following components into a four necked round bottom flask fitted with a thermocouple, mechanical stirrer, and condenser: 538 grams of butyl acrylate, 433 grams of FOMREZ® 66-56 (hydroxyl terminated saturated linear polyester polyol, commercially available from Chemtura), 433 grams of POLYMEG® 2000 polyol (polytetramethylene ether glycol, commercially available from LyondellBasell), 3.1 grams of 2,6-di-tert-butyl 4-methyl phenol, 41.4 grams of hydroxyethyl methacrylate (HEMA), 140 grams of dimethylol propionic acid (DMPA), and 6.3 grams of triethylamine. The mixture was heated to 50° C. and held for 15 minutes. Next, 601.0 grams of isophorone diisocyanate was charged into the flask over 10 minutes, and mixed for 15 minutes. After mixing, 39 grams of butyl acrylate and 1.6 grams of dibutyl tin dilaurate (DBTDL) was charged into the flask and immediate exotherm was observed. After exotherm subsided, the mixture was heated to 90° C. and held for 60 minutes. The mixture was cooled to 70° C. and 538 grams of butyl acrylate and 94.0 grams of hexanediol diacrylate were charged into the flask. The resulting mixture was kept at 60° C. before being dispersed into water.

Part B: A latex comprising polyurethane-acrylic core-shell particles with urea linkages, urethane linkages, pendant carboxylic acid functionality, and pendant keto functionality on the polyurethane shell was prepared by charging the following components into a four necked round bottom flask fitted with a thermocouple, mechanical stirrer, and condenser: 2400.0 grams of deionized water, 215 grams of diacetone acrylamide, 88 grams of dimethyl ethanolamine, and 50 grams of ethylenediamine. The mixture was heated to 70° C. and held for two hours with an $N_2$ blanket. After heating the mixture, 1925 grams of deionized water and 40 grams of AEROSOL® OT-75 (surfactant, commercially available from Cytec) were charged into the flask and held at 50° C. for 15 minutes. Next, 2600.0 grams of the polyurethane prepared in Part A was dispersed into the flask over 20 minutes and mixed for an additional 15 minutes. A mixture of 7.7 grams of ammonium persulfate and 165 grams of deionized water was then charged into the flask over 15 minutes. The temperature rose from 50° C. to 80° C. due to polymerization exotherm. The mixture was held at 75° C. for an additional hour. After being cooled to 40° C., 1.2 grams of FOAMKILL® 649 (non-silicone defoamer, commercially available from Crucible Chemical Company), 25 grams of ACTICIDE® MBS (microbiocide formed of a mixture of 1,2-benzisothiazolin-3-one and 2-methyl-4-isothiazolin-3-one, commercially available from Thor GmbH), and 55 grams of deionized water were charged and mixed for an additional 15 minutes. The resulting latex had a solid content of 38.6% and an average particle size of 60 nm. The average particle size was determined with a Zetasizer 3000HS following the instructions in the Zetasizer 3000HS manual.

Example 4

Preparation of a Latex Having Keto Functional Core-Shell Particles

Part A: A polyurethane was first prepared by charging the following components into a four necked round bottom flask fitted with a thermocouple, mechanical stirrer, and condenser: 566 grams of butyl acrylate, 455 grams of FOMREZ® 66-56 (hydroxyl terminated saturated linear polyester polyol, commercially available from Chemtura), 455 grams of POLYMEG® 2000 polyol (polytetramethylene ether glycol, commercially available from LyondellBasell), 3.3 grams of 2,6-di-tert-butyl 4-methyl phenol, 43.5 grams of hydroxyethyl methacrylate (HEMA), 137.5 grams of dimethylol propionic acid (DMPA), and 6.6 grams of triethylamine. The mixture was heated to 50° C. and held for 15 minutes. After heating the mixture, 632 grams of isophorone diisocyanate was charged into the flask over 10 minutes and mixed for 15 minutes. Next, 41 grams of butyl acrylate and 1.7 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 566 grams of methyl methacrylate and 99 grams of hexanediol diacrylate were charged into the flask. The mixture was kept at 60° C. before being dispersed into water.

Part B: A latex comprising polyurethane-acrylic core-shell particles with urea linkages, urethane linkages, pendant carboxylic acid functionality, and pendant keto functionality on the polyurethane shell was prepared by charging the following components into a four necked round bottom flask fitted with a thermocouple, mechanical stirrer, and condenser: 2200.0 grams of deionized water, 232 grams of diacetone acrylamide, 89 grams of dimethyl ethanolamine, and 58 grams of ethylenediamine. The mixture was heated to 70° C. and held for two hours with an $N_2$ blanket. After heating the mixture, 2100 grams of deionized water was charged into the flask and held at 50° C. for 15 minutes. Next, 2800.0 grams of the polyurethane prepared in Part A was dispersed into the flask over 20 minutes and mixed for an additional 15 minutes. A mixture of 8.1 grams of ammonium persulfate and 348 grams of deionized water was then charged into the flask over 15 minutes. The temperature rose from 50° C. to 75° C. due to polymerization exotherm. The mixture was held at 75° C. for an additional hour. After being cooled to 40° C., 1.2 grams of FOAMKILL® 649 (non-silicone defoamer, commercially available from Crucible Chemical Company), 25 grams of ACTICIDE® MBS (microbiocide formed of a mixture of 1,2-benzisothiazolin-3-one and 2-methyl-4-isothiazolin-3-one, commercially available from Thor GmbH), and 58 grams of deionized water were charged and mixed for an additional 15 minutes. The resulting latex had a solid content of 40.8% and an average particle size of 77 nm. The average particle size was determined with a Zetasizer 3000HS following the instructions in the Zetasizer 3000HS manual.

Example 5

Preparation of a Polymeric Hydrazide Functional Polyurethane with Hydrazine

Part A: An isocyanate functional polyurethane was first prepared by charging the following components into a four necked round bottom flask fitted with a thermocouple, mechanical stirrer, and condenser: 313 grams of methylethyl ketone (MEK), 746.6 grams of FOMREZ® 66-56 (hydroxyl terminated saturated linear polyester polyol, commercially available from Chemtura), 112 grams of dimethylol propionic acid (DMPA), and 5.4 grams of triethylamine. The mixture was heated to 50° C. and held for 15 minutes. Next, 500 grams of isophorone diisocyanate was charged into the flask over 10 minutes, and mixed for 15 minutes. After mixing, 45 grams of MEK and 2.25 grams of dibutyl tin dilaurate (DBTDL) was charged into the flask and immediate exotherm was observed. After exotherm subsided, the mixture was heated to 90° C. and held for 60 minutes. The NCO equivalent weight was measured to be 940. The resulting mixture was kept at 60° C. before being dispersed into water.

Part B: An aqueous dispersion of hydrazide functional polyurethanes was prepared by charging the following components into a four necked round bottom flask fitted with a thermocouple, mechanical stirrer, and condenser at room temperature: 1800 grams of deionized water, 70.5 grams of dimethyl ethanolamine, and 110 grams of 35% hydrazine. Next, 1650 grams of the isocyanate functional polyurethane made in Part A was dispersed into the flask over 20 minutes. The mixture was then heated up to 60° C. and mixed for an additional 30 minutes. Vacuum was applied to strip off 500 grams of MEK and water. After being cooled to 40° C., 0.3 grams of FOAMKILL® 649 (non-silicone defoamer, commercially available from Crucible Chemical Company), 6 grams of ACTICIDE® MBS (microbiocide formed of a mixture of 1,2-benzisothiazolin-3-one and 2-methyl-4-isothiazolin-3-one, commercially available from Thor GmbH), and 45 grams of deionized water were charged and mixed for an additional 15 minutes. The resulting dispersion was filtered via a 10 m bag. The final dispersion had a solids content of 41.2%.

Example 6

Preparation of a Polymeric Hydrazide Functional Polyurethane with Adipic Acid Dihydrazide Part A: An isocyanate functional polyurethane was first prepared by charging the following components into a four necked round bottom flask fitted with a thermocouple, mechanical stirrer, and condenser: 209 grams of methylethyl ketone (MEK), 497.7 grams of FOMREZ® 66-56 (hydroxyl terminated saturated linear polyester polyol, commercially available from Chemtura), 75 grams of dimethylol propionic acid (DMPA), and 3.6 grams of triethylamine. The mixture was heated to 50° C. and held for 15 minutes. Next, 333 grams of isophorone diisocyanate was charged into the flask over 10 minutes, and mixed for 15 minutes. After mixing, 40 grams of MEK and 1.5 grams of dibutyl tin dilaurate (DBTDL) was charged into the flask and immediate exotherm was observed. After exotherm subsided, the mixture was heated to 90° C. and held for 60 minutes. The NCO equivalent weight was measured to be 899. The resulting mixture was kept at 60° C. before being dispersed into water.

Part B: An aqueous dispersion of hydrazide functional polyurethanes was prepared by charging the following components into a four necked round bottom flask fitted with a thermocouple, mechanical stirrer, and condenser at room temperature: 2200 grams of deionized water, 47 grams of dimethyl ethanolamine, and 150 grams of adipic acid dihydrazide. Next, 1100 grams of the isocyanate functional polyurethane made in Part A was dispersed into the flask over 20 minutes. The mixture was then heated up to 60° C. and mixed for an additional 30 minutes. Vacuum was applied to strip off 290 grams of MEK and water. After being cooled to 40° C., 1.0 gram of FOAMKILL® 649 (non-silicone defoamer, commercially available from Crucible Chemical Company), 13 grams of ACTICIDE® MBS (microbiocide formed of a mixture of 1,2-benzisothiazolin-3-one and 2-methyl-4-isothiazolin-3-one, commercially available from Thor GmbH), and 30 grams of deionized water were charged and mixed for an additional 15 minutes. The resulting dispersion was filtered via a 10 m bag. The final dispersion had a solids content of 34.7%.

Example 7

Preparation of a Latex having Hydrazide Functional Core-Shell Particles

Part A: An isocyanate functional polyurethane was first prepared by charging the following components into a four necked round bottom flask fitted with a thermocouple, mechanical stirrer, and condenser: 260 grams of butyl acrylate, 423 grams of FOMREZ® 66-56 (hydroxyl terminated saturated linear polyester polyol, commercially available from Chemtura), 0.8 grams of 2,6-di-tert-butyl 4-methyl phenol, 13.0 grams of hydroxyethyl methacrylate (HEMA), 64 grams of dimethylol propionic acid (DMPA), and 3.0 grams of triethylamine. The mixture was heated to 50° C. and held for 15 minutes. Next, 273 grams of isophorone diisocyanate was charged into the flask over 10 minutes, and mixed for 15 minutes. After mixing, 35 grams of butyl acrylate and 1.0 gram of dibutyl tin dilaurate (DBTDL) was charged into the flask and immediate exotherm was observed. After exotherm subsided, the mixture was heated to 90° C. and held for 60 minutes. The NCO equivalent weight was measured to be 1190. The resulting mixture was kept at 60° C. before being dispersed into water.

Part B: A latex comprising polyurethane-acrylic core-shell particles with urethane linkages, pendant carboxylic acid functionality, and hydrazide functionality on the polyurethane shell was prepared by charging the following components into a four necked round bottom flask fitted with a thermocouple, mechanical stirrer, and condenser: 2000.0 grams of deionized water, 37.0 grams of dimethyl ethanolamine, and 135 grams of adipic acid hydrazide. The mixture was heated to 50° C. with an $N_2$ blanket. After heating the mixture, 935 grams of the polyurethane prepared in Part A was dispersed into the flask over 20 minutes and mixed for an additional 15 minutes. A mixture of 3.0 grams of ammonium persulfate and 30 grams of deionized water was then charged into the flask over 15 minutes. The temperature rose from 50° C. to 63° C. due to polymerization exotherm. The mixture was held at 75° C. for an additional hour. After being cooled to 40° C., 0.2 grams of FOAMKILL® 649 (non-silicone defoamer, commercially available from Crucible Chemical Company), 10 grams of ACTICIDE® MBS (microbiocide formed of a mixture of 1,2-benzisothiazolin-3-one and 2-methyl-4-isothiazolin-3-one, commercially available from Thor GmbH), and 30 grams of deionized water were charged and mixed for an additional 15 minutes. The resulting latex had a solids content of 34.0%.

Example 8

Preparation of a Basecoat Composition

A basecoat composition was prepared with the components listed in Table 1.

TABLE 1

| Component | Part by Weight (grams) |
| --- | --- |
| Latex of Example 1 | 249.99 |
| Adipic acid dihydrazide | 3.24 |
| CARBODILITE ® V-02-L2 [1] | 10.00 |
| BYK ® 348 [2] | 0.23 |
| Odorless mineral spirits [3] | 7.50 |
| 2-ethylhexanol | 7.50 |
| Deionized water | 242.92 |
| LAPONITE ® RD [4] | 1.81 |
| Butyl CARBITOL ™ [5] | 10.00 |
| Aluminum paste [6] | 31.43 |
| Hexyl CELLOSOLVE ™ [7] | 3.00 |
| Aluminum passivator [8] | 10.11 |
| 50% DMEA [9] | 0.33 |

[1] Waterborne carbodiimide crosslinker with a hydrophilic segment, commercially available from GSI Exim America, Inc.
[2] Polyether modified siloxane, commercially available from BYK.
[3] Organic solvent, commercially available from Shell Chemical Co.
[4] Sodium lithium magnesium layered silicate, commercially available from BYK.
[5] Diethylene glycol monobutyl ether, commercially available from Dow.
[6] TSB 2180A aluminum paste, commercially available from Toyal America.
[7] Ethylene glycol monohexyl ether, commercially available from Dow.
[8] Aluminum passivator.
[9] Dimethylethanolamine 50% aqueous solution.

The components listed in Table 1 were mixed with a conventional stir blade while preventing foaming and air entrapment.

Example 9

Preparation of a Basecoat Composition

A basecoat composition was prepared with the components listed in Table 2.

TABLE 2

| Component | Part by Weight (grams) |
| --- | --- |
| Latex of Example 3 | 233.72 |
| Adipic acid dihydrazide | 2.73 |
| CARBODILITE ® V-02-L2 [1] | 10.00 |
| BYK ® 348 [2] | 0.23 |
| Odorless mineral spirits [3] | 7.50 |
| 2-ethylhexanol | 7.50 |
| Deionized water | 114.52 |
| LAPONITE ® RD [4] | 1.81 |

TABLE 2-continued

| Component | Part by Weight (grams) |
| --- | --- |
| Butyl CARBITOL ™ [5] | 10.00 |
| Aluminum paste [6] | 31.43 |
| Hexyl CELLOSOLVE ™ [7] | 3.00 |
| Aluminum passivator [8] | 10.11 |
| 50% DMEA [9] | 0.40 |

The components listed in Table 2 were mixed with a conventional stir blade while preventing foaming and air entrapment.

Example 10

Preparation of a Basecoat Composition

A basecoat composition was prepared with the components listed in Table 3.

TABLE 3

| Component | Part by Weight (grams) |
| --- | --- |
| Latex of Example 3 | 153.33 |
| Adipic acid dihydrazide | 1.79 |
| Polyester resin [10] | 100.00 |
| CARBODILITE ® V-02-L2 [1] | 10.00 |
| BYK ® 348 [2] | 0.26 |
| BYK ® 032 [11] | 1.92 |
| Deionized water | 44.80 |
| Extender Tint [12] | 48.25 |
| White Tint [13] | 33.13 |
| Yellow Tint [14] | 8.00 |
| Black Tint [15] | 21.36 |
| BYKETOL ® WS [16] | 9.00 |
| SURFYNOL ® 104E [17] | 4.00 |
| Isopropanol | 9.00 |
| TALCRON ® MP1052 [18] | 4.00 |

[10] Polyester resin prepared according to Example 9 of U.S. Pat. No. 6,762,240, which is incorporated by reference herein. The acid groups of the polyester were 100% neutralized with dimethyl ethanol amine. The polyester was diluted to 20% solid with water before use.
[11] Emulsion of paraffin-based mineral oils and hydrophobic components, commercially available from BYK.
[12] Extender tint paste consisting of 61% barium sulfate dispersed in 10% acrylic polymer and having a solids content of 71%.
[13] White tint paste consisting of 61% TiO$_2$ dispersed in 9% acrylic polymer blend and having a solids content of 70%.
[14] Yellow tint paste consisting of 25% yellow iron oxide dispersed in 21% acrylic polymer and having a solids content of 46%.
[15] Black tint paste consisting of 6% carbon black dispersed in 18% acrylic polymer and having a solids content of 24%.
[16] Silicone-free surface additive, commercially available from BYK.
[17] Surfactant, commercially available from Air Products.
[18] Magnesium silicate, commercially available from Barretts Minerals.

The components listed in Table 3 were mixed with a conventional stir blade while preventing foaming and air entrapment.

Example 11

Preparation of a Basecoat Composition

A basecoat composition was prepared with the components listed in Table 4.

TABLE 4

| Component | Part by Weight (grams) |
|---|---|
| Latex of Example 3 | 196.62 |
| Adipic acid dihydrazide | 2.41 |
| CARBODILITE ® V-02-L2 [1] | 9.88 |
| Black tint [19] | 50.48 |
| Red tint [20] | 15.95 |
| BYK ® 348 [2] | 0.43 |
| BYK ® 032 [11] | 1.73 |
| BYKETOL ® WS [16] | 11.12 |
| SURFYNOL ® 104E [17] | 11.38 |
| Deionized water | 53.00 |

[19]Black tint paste consisting of 6% carbon black dispersed in 15% acrylic polymer and having a solids content of 22%.
[20]Red tint paste consisting of 13% transparent iron oxide red dispersed in 13% acrylic polymer and having a solids content of 27%.

The components listed in Table 4 were mixed with a conventional stir blade while preventing foaming and air entrapment.

Example 12

Preparation of a Basecoat Composition

A basecoat composition was prepared with the components listed in Table 5.

TABLE 5

| Component | Part by Weight (grams) |
|---|---|
| Latex of Example 2 | 200.88 |
| Adipic acid dihydrazide | 1.81 |
| CARBODILITE ® V-02-L2 [1] | 9.52 |
| Black tint [19] | 48.65 |
| Red tint [20] | 15.37 |
| BYK ® 348 [2] | 0.42 |
| BYK ® 032 [11] | 1.66 |
| BYKETOL ® WS [16] | 10.71 |
| SURFYNOL ® 104E [17] | 10.97 |
| Deionized water | 34.40 |

The components listed in Table 5 were mixed with a conventional stir blade while preventing foaming and air entrapment.

Example 13

Preparation and Evaluation of Multi-Layer Coatings Having One Basecoat Layer Two separate multi-layer coatings were prepared by separately applying: (i) the basecoat composition of Example 11 in two coats over a first 4 inch by 12 inch steel panel that was pre-coated with an ED 6465 electrocoat (an electrocoat commercially available from PPG); and (ii) the basecoat composition of Example 12 in two coats over a second 4 inch by 12 inch steel panel that was pre-coated with an ED 6465 electrocoat (an electrocoat commercially available from PPG). The basecoats of Examples 11 and 12 were applied under controlled conditions of 70-75° F. and 50-60% relative humidity. Each composition was then flashed at ambient temperature for five minutes and then dehydrated for five minutes at 80° C. The film thickness was approximately 1.0 mil. After forming the basecoat layer, a 2K CERAMICLEAR® repair clearcoat (commercially available from PPG Industries, Inc.) was modified with 25% isocyanate equivalents of DESMODUR® Z-4470 BA (aliphatic polyisocyanate, commercially available from Covestro) and applied over the basecoated panels in two coats without a flash between coats. The coated panels were allowed to flash for 10 minutes at ambient conditions and baked for 30 minutes at 80° C. The dry film thickness of the clearcoat was approximately 1.95 mils.

Appearance and physical properties of the resulting multilayered coatings are listed in Table 6.

TABLE 6

| Coating sample | Long-wave[23] | Short-wave[24] | Adhesion[25] | Adhesion after 1 hr[26] | Adhesion after 24 hr[26] |
|---|---|---|---|---|---|
| Sample A [21] | 3 | 15 | 5 | 5 | 5 |
| Sample B [22] | 3 | 16 | 5 | 5 | 5 |

[21]Multi-layer coating comprising a primer coating layer, a first and second basecoat layer prepared from the composition of Example 11, and a clear topcoat layer.
[22]Multi-layer coating comprising a primer coating layer, a first and second basecoat layer prepared from the composition of Example 12, and a clear topcoat layer.
[23]Longwave surface texture evaluation. The longwave surface texture was measured with a BYK Wavescan Dual instrument (manufactured by BYK) following the instructions of the BYK Wavescan Dual instrument manual. Lower longwave values are more desirable.
[24]Shortwave surface texture evaluation. The shortwave surface texture was measured with a BYK Wavescan Dual instrument (manufactured by BYK) following the instructions of the BYK Wavescan Dual instrument manual. Lower shortwave values are more desirable.
[25]Adhesion was determined in accordance with ASTM D3359-09e2. The adhesion results were reported on a scale of 0 to 5 with 0 as the worst and 5 as the best.
[26]The panels were subjected to a 10 day humidity resistance test similar to ASTM D1735-92 that was conducted in a Harshaw Equipment GS "Uni-Fog" corrosion test cabinet set at 100° F. and 100% relative humidity. The adhesion of the panels were then determined in accordance with ASTM D3359-09e2 after one hour and 24 hours following completion of the test. The adhesion results were reported on a scale of 0 as the worst to 5 as the best.

Example 14

Preparation and Evaluation of Multi-Layer Coatings

Two separate multi-layer coatings were prepared by first applying the basecoat composition of Example 10 in one coat over 4 inch by 12 inch steel panels that were pre-coated with an ED 6465 electrocoat (an electrocoat commercially available from PPG). The basecoat composition of Example 10 was then flashed at ambient temperature for five minutes. The film thickness was approximately 0.75 mils. The basecoat compositions of Examples 8 and 9 were next applied in two coats, without a flash between coats, over separate panels coated with the basecoat of Example 10. Each composition was then flashed at ambient temperature for five minutes and then dehydrated for five minutes at 80° C. The film thickness of the second basecoats were each approximately 0.55 mils. After forming the second basecoat layers, a 2K CERAMICLEAR® repair clearcoat (commercially available from PPG Industries, Inc.) was modified with 25% isocyanate equivalents of DESMODUR® Z-4470 BA (aliphatic polyisocyanate, commercially available from Covestro) and applied over the basecoated panels in two coats without a flash between coats. The coated panels were allowed to flash for 10 minutes at ambient condition and baked for 30 minutes at 80° C. The clearcoat dry film thickness was approximately 1.95 mils.

Appearance and physical properties of the resulting multi-layered coatings are listed in Table 7.

TABLE 7

| Coating sample | Long-wave[23] | Short-wave[24] | Flop Index[29] | Adhesion[25] | Adhesion after 1 hr[26] | Adhesion after 24 hr[26] |
|---|---|---|---|---|---|---|
| Sample A [27] | 4 | 15 | 14 | 5 | 0 | 4 |
| Sample B [28] | 10 | 33 | 10 | 5 | 4 | 5 |

[27]Multi-layer coating comprising a primer coating layer, a first basecoat layer prepared from the composition of Example 10, a second basecoat layer prepared from the composition of Example 8, and a clear topcoat layer.
[28]Multi-layer coating comprising a primer coating layer, a first basecoat layer prepared from the composition of Example 10, a second basecoat layer prepared from the composition of Example 9, and a clear topcoat layer.
[29]A measure of the change in lightness of the metallic color as the coating is tilted through the entire range of viewing angles. The flop index was measured with a BYK Wavescan Dual instrument (manufactured by BYK) following the instructions of the BYK Wavescan instrument manual. Higher flop index values are more desirable.

Examples 15-17

Preparation of Basecoat Compositions Having Different Hydrazide Functional Components Three separate basecoat compositions were prepared having: (i) polyurethane-acrylic core-shell particles with pendant keto functionality on the polyurethane shell; and (ii) different hydrazide functional components. Each basecoat composition was prepared with the components listed in Table 8.

TABLE 8

| Components | Example 15 Parts by Weight (grams) | Example 16 Parts by Weight (grams) | Example 17 Parts by Weight (grams) |
|---|---|---|---|
| Latex of Example 4 | 156.40 | 100.89 | 111.12 |
| Adipic acid dihydrazide | 1.83 | 0.00 | 0.00 |
| Polymeric hydrazide of Example 5 | 0.00 | 60.26 | 0.00 |
| Latex of Example 7 (hydrazide functional) | 0.00 | 0.00 | 57.35 |
| Polyester Resin [10] | 100.00 | 100.00 | 100.00 |
| CARBODILITE ® V-02-L2 [1] | 10.00 | 10.00 | 10.00 |

TABLE 8-continued

| Components | Example 15 Parts by Weight (grams) | Example 16 Parts by Weight (grams) | Example 17 Parts by Weight (grams) |
|---|---|---|---|
| BYK ® 348 [2] | 0.26 | 0.26 | 0.26 |
| BYK ® 032 [11] | 1.92 | 1.92 | 1.92 |
| Deionized Water | 102.00 | 10.00 | 112.26 |
| Extender Tint [12] | 48.25 | 48.25 | 48.25 |
| White Tint [13] | 33.13 | 33.13 | 33.13 |
| Yellow Tint [14] | 8.00 | 8.00 | 8.00 |
| Black Tint [15] | 21.36 | 21.36 | 21.36 |
| BYKETOL ® WS [16] | 9.00 | 9.00 | 9.00 |
| SURFYNOL ® 104E [17] | 4.00 | 4.00 | 4.00 |
| Isopropanol | 9.00 | 9.00 | 9.00 |
| TALCRON ® MP1052 [18] | 4.00 | 4.00 | 4.00 |

The components listed in Table 8 were mixed with a conventional stir blade while preventing foaming and air entrapment.

Examples 18-20

Preparation of Basecoat Compositions Having Different Hydrazide Functional Components Three separate basecoat compositions were prepared having: (i) polyurethane-acrylic core-shell particles with keto functionality on the acrylic core; and (ii) different hydrazide functional components. Each basecoat composition was prepared with the components listed in Table 9.

TABLE 9

| Components | Example 18 Parts by Weight (grams) | Example 19 Parts by Weight (grams) | Example 20 Parts by Weight (grams) |
|---|---|---|---|
| Latex of Example 1 | 249.99 | 152.29 | 169.27 |
| Adipic acid dihydrazide | 3.24 | 0.00 | 0.00 |
| Polymeric hydrazide of Example 5 | 0.00 | 101.28 | 0.00 |
| Latex of Example 7 (hydrazide functional) | 0.00 | 0.00 | 97.65 |
| CARBODILITE ® V-02-L2 [1] | 10.00 | 10.00 | 10.00 |
| BYK ® 348 [2] | 0.23 | 0.23 | 0.23 |
| Odorless mineral spirits [3] | 7.50 | 7.50 | 7.50 |
| 2-ethylhexanol | 7.50 | 7.50 | 7.50 |
| Deionized water | 403.49 | 169.82 | 248.72 |
| LAPONITE ® RD [4] | 1.81 | 1.81 | 1.81 |
| Butyl CARBITOL ™ [5] | 10.00 | 10.00 | 10.00 |
| Aluminum paste [6] | 31.43 | 31.43 | 31.43 |
| Hexyl CELLOSOLVE ™ [7] | 3.00 | 3.00 | 3.00 |
| Aluminum passivator [8] | 10.11 | 10.11 | 10.11 |
| 50% DMEA [9] | 0.00 | 0.00 | 0.40 |

The components listed in Table 9 were mixed with a conventional stir blade while preventing foaming and air entrapment.

Examples 21-30

Preparation and Evaluation of Multi-Layer Coatings

Various multi-layer coatings having two separate basecoats were prepared with the components and final baking temperature listed in Table 10.

TABLE 10

| Multi-layer Coating Example No. | Composition used to form First Basecoat | Composition used to form Second Basecoat | Final Bake Temperature (° C.) |
|---|---|---|---|
| 21 | Example 15 | Example 18 | 80 |
| 22 | Example 16 | Example 18 | 80 |
| 23 | Example 17 | Example 18 | 80 |
| 24 | Example 16 | Example 19 | 80 |
| 25 | Example 17 | Example 20 | 80 |
| 26 | Example 15 | Example 18 | 100 |
| 27 | Example 16 | Example 18 | 100 |
| 28 | Example 17 | Example 18 | 100 |
| 29 | Example 16 | Example 19 | 100 |
| 30 | Example 17 | Example 20 | 100 |

Each multi-layer coating was prepared by spraying their respective first and second basecoat compositions over 4 inch by 12 inch steel panels that were pre-coated with an ED 6465 electrocoat (an electrocoat commercially available from PPG). The basecoats compositions were applied under controlled environmental conditions of 70-75° F. and 50-60% relative humidity. Further, the first basecoat compositions of each multi-layer coating were independently applied in two coats with a 60 second flash at ambient temperature between the coats and then flashed at ambient temperature for five minutes. The film thickness of the first basecoats were within a range of from 0.5-0.7 mils. Next, the second basecoat compositions of each multi-layer coating were applied in two coats, without a 90 second flash between coats, and then flashed at ambient temperature for five minutes and then dehydrated for five minutes at 80° C. The film thickness of the second basecoats were within a range of from 0.5-0.6 mils.

After forming the basecoat layers, a 2K CERAMICLEAR® repair clearcoat (commercially available from PPG Industries, Inc.) was modified with 25% isocyanate equivalents of DESMODUR® Z-4470 BA (aliphatic polyisocyanate, commercially available from Covestro) and applied over the basecoated panels in two coats without a flash between coats. The coated panels were allowed to flash for 10 minutes at ambient conditions and baked for 30 minutes at the baking temperature identified in Table 10 (i.e. 80° C. or 100° C.). The dry film thickness of the clearcoats were within a range of from 1.8-2.0 mils.

Appearance and physical properties of the resulting multi-layered coatings are listed in Table 11.

TABLE 11

| Multi-layer Coating Example No. | Flop Index[29] | Adhesion[25] | Adhesion after 1 hr[26] | Adhesion after 24 hr[26] |
|---|---|---|---|---|
| 21 | 16.3 | 5 | 2 | 5 |
| 22 | 17.6 | 5 | 2 | 5 |
| 23 | 13.2 | 5 | 1 | 5 |
| 24 | 12.3 | 5 | 3 | 5 |
| 25 | 12.9 | 5 | 2 | 5 |
| 26 | N/A | 5 | 3 | 5 |
| 27 | N/A | 5 | 3 | 5 |
| 28 | N/A | 5 | 0 | 5 |
| 29 | N/A | 5 | 5 | 5 |
| 30 | N/A | 5 | 2 | 5 |

The present invention is also directed to the following clauses.

Clause 1: A multi-layer coating comprising: a first basecoat layer applied over at least a portion of a substrate, wherein the first basecoat layer is formed from a first basecoat composition comprising a polyhydrazide and core-shell particles dispersed in an aqueous medium, the core-shell particles of the first basecoat composition comprise (1) a polymeric core at least partially encapsulated by (2) a polymeric shell comprising urea linkages, and keto and/or aldo functional groups; and a second basecoat layer applied over the first basecoat layer, wherein the second basecoat layer is formed from a second basecoat composition comprising a polyhydrazide and core-shell particles dispersed in an aqueous medium, the core-shell particles of the second basecoat composition comprise (1) a polymeric core at least partially encapsulated by (2) a polymeric shell, and wherein the polymeric core of the core-shell particles of the first basecoat composition and the second basecoat composition are each independently covalently bonded to at least a portion of the polymeric shell of the core-shell particles.

Clause 2: The multi-layer coating of clause 1, further comprising a primer coating layer applied over at least a portion of a substrate, wherein the first primer coating layer is positioned between the first basecoat layer and the substrate.

Clause 3: The multi-layer coating of clauses 1 or 2, wherein the polymeric core of the core-shell particles of the first basecoat composition and the second basecoat composition each independently comprise a (meth)acrylate polymer, a vinyl polymer, or a combination thereof.

Clause 4: The multi-layer coating of any of clauses 1 to 3, wherein the polymeric shell of the core-shell particles of the first basecoat composition and the second basecoat composition each independently further comprise urethane linkages and carboxylic acid functional groups.

Clause 5: The multi-layer coating of any of clauses 1 to 4, wherein the first basecoat composition and the second basecoat composition each independently further comprise a carbodiimide dispersed in the aqueous medium.

Clause 6: The multi-layer coating of any of clauses 1 to 5, wherein the core-shell particles of the first basecoat composition are formed from a mixture of reactants comprising: ethylenically unsaturated monomers; a polyurethane prepolymer comprising an isocyanate functional group and an ethylenically unsaturated group; and a reaction product of an ethylenically unsaturated monomer comprising keto and/or aldo functional groups, and a compound comprising at least two amino groups.

Clause 7: The multi-layer coating of any of clauses 1 to 6, wherein the core-shell particles of the first basecoat composition are formed from a mixture of reactants comprising: ethylenically unsaturated monomers; a compound comprising at least two amino groups; and polyurethane prepolymers comprising isocyanate functional groups, ethylenically unsaturated functional groups, and a keto and/or aldo functional groups.

Clause 8: The multi-layer coating of any of clauses 1 to 7, wherein the core-shell particles of the second basecoat composition are different from the core-shell particles of the first basecoat composition.

Clause 9: The multi-layer coating of clause 8, wherein the polymeric core of the core-shell particles of the second basecoat composition comprises keto and/or aldo functional groups.

Clause 10: The multi-layer coating of any of clauses 1 to 9, wherein the polyhydrazide of at least one of the first basecoat composition and the second basecoat composition comprises a polymeric polyhydrazide.

Clause 11: The multi-layer coating of clauses 9 or 10, wherein the polymeric polyhydrazide comprises a polyurethane comprising at least two hydrazide functional groups.

Clause 12: The multi-layer coating of clause 11, wherein the polyurethane comprising at least two hydrazide functional groups is formed from a mixture of reactants comprising: a polyurethane prepolymer comprising isocyanate functional groups; and non-polymeric polyhydrazides.

Clause 13: The multi-layer coating of clause 11, wherein the polyurethane comprising at least two hydrazide functional groups is formed from a mixture of reactants comprising: a polyurethane prepolymer comprising isocyanate functional groups; and hydrazine.

Clause 14: The multi-layer coating of any of clauses 10 to 13, wherein the polymeric polyhydrazide is a core-shell particle comprising (1) a polymeric core at least partially encapsulated by (2) a polymeric shell comprising hydrazide functional groups, wherein the polymeric core is covalently bonded to at least a portion of the polymeric shell.

Clause 15: The multi-layer coating of clause 14, wherein the polymeric polyhydrazide core-shell particle is formed from a mixture of reactants comprising: ethylenically unsaturated monomers; a polyurethane prepolymer comprising an isocyanate functional group and an ethylenically unsaturated group; and hydrazine and/or non-polymeric polyhydrazides.

Clause 16: The multi-layer coating of any of clauses 10 to 15, wherein the first basecoat composition comprises a polymeric polyhydrazide, and the second basecoat composition comprises a non-polymeric polyhydrazide and is free of a polymeric polyhydrazide.

Clause 17: The multi-layer coating of any of clauses 1 to 16, further comprising a topcoat layer applied over at least a portion of the second basecoat layer.

Clause 18: The multi-layer coating of any of clauses 1 to 17, wherein the first basecoat composition and the second basecoat composition comprise at least one pigment.

Clause 19: The multi-layer coating of any of clauses 1 to 18, wherein the first basecoat composition comprises at least one pigment that imparts a continuous unchanging color and the second basecoat composition comprises at least one special effect pigment.

Clause 20: A process of coating a substrate with a multi-layer coating comprising: forming a first basecoat layer over at least a portion of a substrate by depositing a first basecoat composition directly onto at least a portion of the substrate, wherein the first basecoat layer is formed from a first basecoat composition comprising a polyhydrazide and core-shell particles dispersed in an aqueous medium, the core-shell particles of the first basecoat composition comprise (1) a polymeric core at least partially encapsulated by (2) a polymeric shell comprising urea linkages, and keto and/or aldo functional groups; and forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated, wherein the second basecoat layer is formed from a second basecoat composition comprising a polyhydrazide and core-shell particles dispersed in an aqueous medium, the core-shell particles of the second basecoat composition comprise (1) a polymeric core at least partially encapsulated by (2) a polymeric shell, and wherein the polymeric core of the core-shell particles of the first basecoat composition and the second basecoat composition are each independently covalently bonded to at least a portion of the polymeric shell of the core-shell particles.

Clause 21: The process of clause 20, wherein the substrate comprises a primer coating layer and the first basecoat layer is applied over at least a portion of the primer coating layer by depositing a first basecoat composition directly onto at least a portion of the primer coating layer.

Clause 22: The process of clauses 20 or 21, wherein the polymeric core of the core-shell particles of the first basecoat composition and the second basecoat composition each independently comprise a (meth)acrylate polymer, a vinyl polymer, or a combination thereof.

Clause 23: The process of any of clauses 20 to 22, wherein the polymeric shell of the core-shell particles of the first basecoat composition and the second basecoat composition each independently further comprise urethane linkages and carboxylic acid functional groups.

Clause 24: The process of any of clauses 20 to 23, wherein the first basecoat composition and the second basecoat composition each independently further comprise a carbodiimide dispersed in the aqueous medium.

Clause 25: The process of any of clauses 20 to 24, wherein the polyhydrazide of at least one of the first basecoat composition and the second basecoat composition comprises a polymeric polyhydrazide.

Clause 26: The process of any of clauses 20 to 25, wherein the first basecoat composition comprises a polymeric polyhydrazide, and the second basecoat composition comprises a non-polymeric polyhydrazide and is free of a polymeric polyhydrazide.

Clause 27: The process of any of clauses 20 to 26, wherein the core-shell particles of the second basecoat composition are different from the core-shell particles of the first basecoat composition.

Clause 28: The process of clause 27, wherein the polymeric core of the core-shell particles of the second basecoat composition comprises keto and/or aldo functional groups.

Clause 29: The process of any of clauses 20 to 28, wherein the first basecoat composition and the second basecoat composition comprise at least one pigment.

Clause 30: The process of any of clauses 20 to 29, wherein the first basecoat composition comprises at least one pigment that imparts a continuous unchanging color and the second basecoat composition comprises at least one special effect pigment.

Clause 31: The process of any of clauses 20 to 30, wherein the first basecoat composition is dehydrated before application of the second basecoat composition at a temperature within a range of ambient temperature to 140° C.

Clause 32: The process of clause 31, wherein the second basecoat layer is dehydrated after application thereof at a temperature within a range of ambient temperature to 140° C.

Clause 33: The process of any of clauses 20 to 30, wherein both the first and second basecoat composition are simultaneously dehydrated at a temperature range of ambient to 140° C.

Clause 34: The process of any of clauses 21 to 33, wherein the primer coating layer is formed by electrodepositing an electrodepositable coating composition on at least a portion of the substrate.

Clause 35: The process of any of clauses 20 to 34, further comprising forming a clear coating layer over at least a portion of the second basecoat layer by depositing a clear coating composition directly onto at least a portion of the second basecoat layer.

Whereas particular embodiments of this invention have been described above for purposes of illustration, it will be evident to those skilled in the art that numerous variations of the details of the present invention may be made without departing from the invention as defined in the appended claims.

The invention claimed is:
1. A multi-layer coating comprising:
a first basecoat layer applied over at least a portion of a substrate, wherein the first basecoat layer is formed from a first basecoat composition comprising a polyhydrazide and core-shell particles dispersed in an aqueous medium, the core-shell particles of the first basecoat composition comprise (1) a polymeric core at least partially encapsulated by (2) a polymeric shell comprising urea linkages, and keto and/or aldo functional groups; and
a second basecoat layer applied over the first basecoat layer, wherein the second basecoat layer is formed from a second basecoat composition comprising a polyhydrazide and core-shell particles dispersed in an aqueous medium, the core-shell particles of the second basecoat composition comprise (1) a polymeric core at least partially encapsulated by (2) a polymeric shell, and
wherein the polymeric core of the core-shell particles of the first basecoat composition and the second basecoat composition are each independently covalently bonded to at least a portion of the polymeric shell of the core-shell particles.

2. The multi-layer coating of claim 1, further comprising a primer coating layer applied over at least a portion of a substrate, wherein the first primer coating layer is positioned between the first basecoat layer and the substrate.

3. The multi-layer coating of claim 1, wherein the polymeric core of the core-shell particles of the first basecoat composition and the second basecoat composition each independently comprise a (meth)acrylate polymer, a vinyl polymer, or a combination thereof.

4. The multi-layer coating of claim 1, wherein the polymeric shell of the core-shell particles of the first basecoat composition and the second basecoat composition each independently comprise urethane linkages and carboxylic acid functional groups.

5. The multi-layer coating of claim 4, wherein the first basecoat composition and the second basecoat composition each independently further comprise a carbodiimide dispersed in the aqueous medium.

6. The multi-layer coating of claim 1, wherein the core-shell particles of the first basecoat composition are formed from a mixture of reactants comprising:
ethylenically unsaturated monomers;
a polyurethane prepolymer comprising an isocyanate functional group and an ethylenically unsaturated group; and
a reaction product of an ethylenically unsaturated monomer comprising keto and/or aldo functional groups, and a compound comprising at least two amino groups.

7. The multi-layer coating of claim 1, wherein the core-shell particles of the first basecoat composition are formed from a mixture of reactants comprising:
ethylenically unsaturated monomers;
a compound comprising at least two amino groups; and
polyurethane prepolymers comprising isocyanate functional groups, ethylenically unsaturated functional groups, and a keto and/or aldo functional groups.

8. The multi-layer coating of claim 1, wherein the core-shell particles of the second basecoat composition are different from the core-shell particles of the first basecoat composition.

9. The multi-layer coating of claim 8, wherein the polymeric core of the core-shell particles of the second basecoat composition comprises keto and/or aldo functional groups.

10. The multi-layer coating of claim 1, wherein the polyhydrazide of at least one of the first basecoat composition and the second basecoat composition comprises a polymeric polyhydrazide.

11. The multi-layer coating of claim 10, wherein the polymeric polyhydrazide comprises a polyurethane comprising at least two hydrazide functional groups.

12. The multi-layer coating of claim 11, wherein the polyurethane comprising at least two hydrazide functional groups is formed from a mixture of reactants comprising:
a polyurethane prepolymer comprising isocyanate functional groups; and
non-polymeric polyhydrazides.

13. The multi-layer coating of claim 11, wherein the polyurethane comprising at least two hydrazide functional groups is formed from a mixture of reactants comprising:
a polyurethane prepolymer comprising isocyanate functional groups; and
hydrazine.

14. The multi-layer coating of claim 10, wherein the polymeric polyhydrazide is a core-shell particle comprising (1) a polymeric core at least partially encapsulated by (2) a polymeric shell comprising hydrazide functional groups, wherein the polymeric core is covalently bonded to at least a portion of the polymeric shell.

15. The multi-layer coating of claim 14, wherein the polymeric polyhydrazide core-shell particle is formed from a mixture of reactants comprising:
ethylenically unsaturated monomers;
a polyurethane prepolymer comprising an isocyanate functional group and an ethylenically unsaturated group; and
hydrazine and/or non-polymeric polyhydrazides.

16. The multi-layer coating of claim 10, wherein the first basecoat composition comprises a polymeric polyhydrazide, and the second basecoat composition comprises a non-polymeric polyhydrazide and is free of a polymeric polyhydrazide.

17. The multi-layer coating of claim 1, further comprising a topcoat layer applied over at least a portion of the second basecoat layer.

18. The multi-layer coating of claim 1, wherein the first basecoat composition and the second basecoat composition comprise at least one pigment.

19. The multi-layer coating of claim 1, wherein the first basecoat composition comprises at least one pigment that imparts a continuous unchanging color and the second basecoat composition comprises at least one special effect pigment.

20. A process of coating a substrate with a multi-layer coating comprising:
forming a first basecoat layer over at least a portion of a substrate by depositing a first basecoat composition directly onto at least a portion of the substrate, wherein the first basecoat layer is formed from a first basecoat composition comprising a polyhydrazide and core-shell particles dispersed in an aqueous medium, the core-shell particles of the first basecoat composition comprise (1) a polymeric core at least partially encapsulated by (2) a polymeric shell comprising urea linkages, and keto and/or aldo functional groups; and
forming a second basecoat layer over at least a portion of the first basecoat layer by depositing a second basecoat composition directly onto at least a portion of (1) the first basecoat layer after the first basecoat composition is dehydrated or (2) the first basecoat composition before the first basecoat composition is dehydrated, wherein the second basecoat layer is formed from a second basecoat composition comprising a polyhydrazide and core-shell particles dispersed in an aqueous medium, the core-shell particles of the second basecoat composition comprise (1) a polymeric core at least partially encapsulated by (2) a polymeric shell, and wherein the polymeric core of the core-shell particles of the first basecoat composition and the second basecoat composition are each independently covalently bonded to at least a portion of the polymeric shell of the core-shell particles.

* * * * *